(12) United States Patent
Ota et al.

(10) Patent No.: US 8,306,708 B2
(45) Date of Patent: Nov. 6, 2012

(54) CONTROL DEVICE FOR VEHICULAR AUTOMATIC TRANSMISSION

(75) Inventors: Keisuke Ota, Toyota (JP); Hitoshi Matsunaga, Anjo (JP); Koji Oshima, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 564 days.

(21) Appl. No.: 12/552,488

(22) Filed: Sep. 2, 2009

(65) Prior Publication Data

US 2010/0057309 A1   Mar. 4, 2010

(30) Foreign Application Priority Data

Sep. 3, 2008 (JP) ................................. 2008-226473

(51) Int. Cl.
*G06F 19/00* (2006.01)
(52) U.S. Cl. ................ 701/51; 477/45; 477/50; 477/95; 477/156; 475/133
(58) Field of Classification Search .................... 701/51, 701/67; 180/305; 477/127, 130, 156, 45, 477/50, 95; 475/133
See application file for complete search history.

(56) References Cited

U.S. PATENT DOCUMENTS

| | | | |
|---|---|---|---|
| 5,393,275 A | 2/1995 | Okada et al. | |
| 5,454,762 A * | 10/1995 | Sawase et al. | 475/84 |
| 5,503,118 A * | 4/1996 | Hollis | 123/41.44 |
| 5,669,280 A * | 9/1997 | Niiyama et al. | 91/31 |
| 5,746,677 A * | 5/1998 | Wakahara et al. | 477/35 |
| 5,916,060 A * | 6/1999 | Jang | 477/155 |
| 6,409,630 B1 * | 6/2002 | Yu | 477/154 |
| 6,505,529 B1 * | 1/2003 | Legner et al. | 74/733.1 |
| 6,715,694 B2 * | 4/2004 | Gebhardt | 239/89 |
| 7,481,053 B2 * | 1/2009 | Kitano et al. | 60/428 |
| 7,611,434 B2 * | 11/2009 | Fukushima et al. | 475/119 |
| 7,713,170 B2 * | 5/2010 | Jeon | 477/162 |
| 7,905,814 B2 * | 3/2011 | Lee | 477/144 |
| 7,909,721 B2 * | 3/2011 | Seid et al. | 475/116 |
| 7,980,995 B2 * | 7/2011 | Weber et al. | 477/127 |
| 8,066,090 B2 * | 11/2011 | Shimizu et al. | 180/305 |
| 2007/0232445 A1 * | 10/2007 | Yamamoto et al. | 477/98 |

FOREIGN PATENT DOCUMENTS

| | | |
|---|---|---|
| JP | 06002762 A | 1/1994 |
| JP | 8166058 A | 6/1996 |
| JP | 8166058 A | 6/1996 |
| JP | 9079365 A | 3/1997 |
| JP | 11125330 A | 5/1999 |
| JP | 11125330 A | 5/1999 |
| JP | 2000213638 A | 8/2000 |
| JP | 2000213638 A | 8/2000 |

* cited by examiner

*Primary Examiner* — Tuan C. To
(74) *Attorney, Agent, or Firm* — Gifford, Krass, Sprinkle, Anderson & Citkowski, P.C.

(57) ABSTRACT

A control device for a vehicular automatic transmission which can realize a shifting with quickened response with suppressing a turbine blow-up during the shifting is provided. When a response in hydraulic pressure control by a hydraulic pressure control circuit 42 fails to satisfy a preset predetermined determining criterion, a shifting response is prevented from improving, in comparison to a case where the determining criterion is satisfied. Under a relatively low response of the hydraulic pressure control by the hydraulic pressure control circuit 42 due to air mixture to working oil, a control to inhibit a high-response shifting or the like is performed, so that a turbine blow-up caused by a delayed response of hydraulic pressure can be prevented. Thus, the control device for the vehicular automatic transmission can be provided, which can realize the shifting with quickened response, with suppressing the turbine blow-up during the shifting.

4 Claims, 8 Drawing Sheets

|  | C1 | C2 | B1 | B2 | B3 | F1 |
|---|---|---|---|---|---|---|
| 1ST | ○ |  |  | ◎ |  | △ |
| 2ND | ○ |  | ○ |  |  |  |
| 3RD | ○ |  |  |  | ○ |  |
| 4TH | ○ | ○ |  |  |  |  |
| 5TH |  | ○ |  |  | ○ |  |
| 6TH |  | ○ | ○ |  |  |  |
| R |  |  |  | ○ | ○ |  |
| N |  |  |  |  |  |  |

◎ ENGAGED UPON ENGINE BRAKE
△ ENGAGED ONLY UPON DRIVING

CONTROL DEVICE FOR VEHICULAR AUTOMATIC TRANSMISSION

This invention is based on Japanese Patent Application 2008-226473 filed on Sep. 3, 2009, and content thereof is incorporated herein for reference.

TECHNICAL FIELD

The present invention relates to control devices for vehicular automatic transmissions and, more particularly, to an improvement to realize a shifting with a favorable response with suppressing a turbine blow-up during the shifting.

BACKGROUND ART

There has been known a control device for a vehicular automatic transmission of the type including a plurality of hydraulically operated engaging elements and a hydraulic pressure control circuit arranged to control hydraulic pressures supplied to the plural hydraulically operated engaging elements. A shifting response is varied based on a preset relation depending on a predetermined condition. For instance, Patent Publication 1 (Japanese Patent Publication No. 9-79365) discloses a control device for a vehicular automatic transmission. With such a technology, in a manual shifting mode performed depending on the operation of a shift lever or the like operated by a driver, a backpressure of an accumulator is controlled associated with the engaging element related to the shifting in such a way as to obtain a relatively rapid shifting response.

On the other hand, during an automatic shifting mode performed depending on a vehicle speed and an accelerator depressed stroke or the like by referring to preset relationships, the backpressure of the accumulator is controlled associated with the engaging element related to the shifting in another way to obtain a further mild shifting response than that of the shifting response achieved in the manual shifting mode. Thus, the shifting response is varied depending on the shifting mode so as to obtain a rapid shifting response required for the manual shifting mode.

In addition to the above technology, other technologies have been known as those disclosed in Patent Publication 2 (Japanese Patent Publication No. 8-166058), Patent Publication 3 (Japanese Patent Publication No. 2000-213638) and Patent Publication 4 (Japanese Patent Publication No. 11-125330).

However, when performing the control which requires a response in hydraulic pressure related to the shifting, like a high-response shifting in a clutch-to-clutch shift in the conventional technology described above, following problem may be occurred. That is, the hydraulic pressure is applied with a delay in response which is caused by air mixed to working oil of the hydraulic pressure control circuit, resulting in occurrence of a turbine blow-up. To avoid such a defect, it has been required to develop a control device for a vehicular automatic transmission which can realize a shifting with a favorable response with suppressing a turbine blow-up during the shifting.

SUMMARY OF THE INVENTION

The present invention has been completed with the above view in mind, and has an object to provide a control device for a vehicular automatic transmission which can realize a shifting with a favorable response with suppressing a turbine blow-up during the shifting.

To achieve such an object, one aspect of the present invention provides a control device for a vehicular automatic transmission which includes a plurality of hydraulically operated engaging elements, and a hydraulic pressure control circuit for controlling hydraulic pressures supplied to the plurality of hydraulically operated engaging elements, and a shifting response of which is quickened depending on a predetermined condition based on a preset relationship. An extent of quickening of the shifting response is suppressed when a response of the hydraulic pressure control executed by the hydraulic pressure control circuit fails to satisfy a preset predetermined determining criterion, compared with when the response satisfies the determining criterion.

According to the first aspect, the vehicular automatic transmission which includes a plurality of hydraulically operated engaging elements, and a hydraulic pressure control circuit for controlling hydraulic pressures supplied to the plurality of hydraulically operated engaging elements, and a shifting response of which is quickened depending on a predetermined condition based on a preset relationship. The extent of quickening the shifting response is suppressed when a response of the hydraulic pressure control executed by the hydraulic pressure control circuit fails to satisfy a preset predetermined determining criterion, compared with when the response satisfies the determining criterion.

Accordingly, when the response of the hydraulic pressure control executed by the hydraulic pressure control circuit is relatively low caused by air being mixed to working oil or the like, the control device performs the control such as inhibition of the high-response shifting. This can properly prevent the occurrence of a turbine blow-up caused by a delayed response in hydraulic pressure. Thus, the control device, capable of realizing the shifting with the favorable response with suppressing the turbine blow-up during the shifting, can be provided.

Preferably, when air is mixed to working oil in the hydraulic pressure control circuit, failure to satisfy the determining criterion is determined. With such structure or operation, a status of relatively low response of the hydraulic pressure control executed by the hydraulic pressure control circuit can be appropriately determined in a practical mode.

Preferably, the extent of quickening of the shifting response is suppressed only during the shifting related to a gear position where the response of the hydraulic pressure control executed by the hydraulic pressure control circuit fails to satisfy the preset predetermined determining criterion, compared with during the shifting related to a gear position where the response satisfies the determining criterion. With such structure or operation, the shifting can be performed with suppressing the turbine blow-up for the shifting of the hydraulic pressure control of relatively low response, and can be performed with a favorable response for the other shifting.

Preferably, the extent of quickening of the shifting response is suppressed during the shifting related to at least one gear position where the response of the hydraulic pressure control executed by the hydraulic pressure control circuit fails to satisfy the preset predetermined determining criterion, compared with during the shifting related to entire gear positions where the response satisfies the determining criterion. With such structure or operation, a driver's uncomfortable feeling caused by the high-response shifting being permitted for a predetermined shifting is inhibited for the other shifting, can be properly prevented.

Preferably, the control device for the vehicular automatic transmission further comprises a shift operation device operative to perform a manual shifting of the automatic transmission depending on a driver's operation, wherein during a shifting initiated depending on an operation of the shift operation device, a high-response shifting control is performed to quicken the shifting response than other shifting, and execution of the high-response shifting control is disabled when the response of the hydraulic pressure control executed by the hydraulic pressure control circuit fails to satisfy the preset predetermined determining criterion. With such structure or operation, occurrence of the turbine blow-up caused by the response delay i.e., delayed response of the hydraulic pressure can be properly prevented regarding the control device for the vehicular automatic transmission which performs the control for quickening the shifting response i.e., shift responding characteristic during the manual shifting effectuated by the shift operation device.

DETAILED DESCRIPTION OF THE PREFERRED EMBODIMENTS

Now, a preferred embodiment of the present invention will be described below in detail with reference to the accompanying drawings.

[Embodiment]

Figure 1:
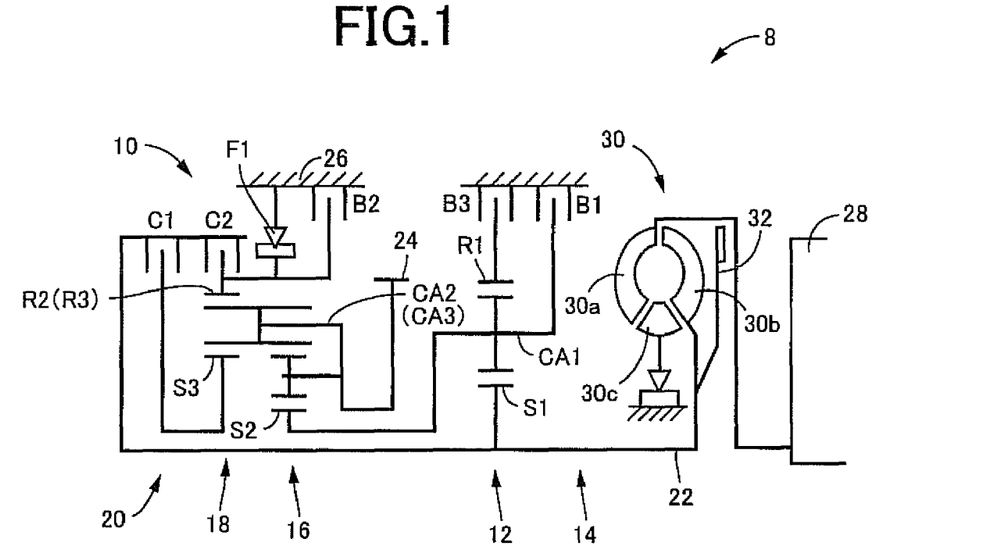
FIG. 1 is a skeleton view of a power transmitting apparatus to which one embodiment according to the present invention is preferably applied.
Figure 2:
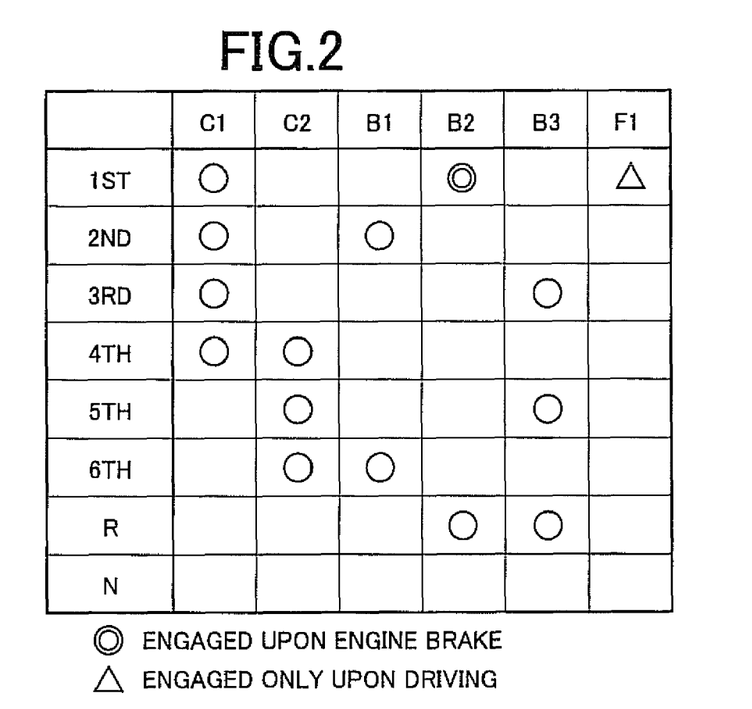
FIG. 2 is an engagement operation table explaining an operation state of engaging elements for establishing a plurality of gear positions in the vehicular automatic transmission provided in the power transfer apparatus shown in FIG. 1.

FIG. 1 is a skeleton view of a power transfer apparatus 8 to which the present invention is preferably applied. FIG. 2 represents an operation table illustrating operating states for engaging elements to be actuated for establishing a plurality of gear positions in a vehicular automatic transmission 10 (hereinafter merely referred to as a "transmission") incorporated in the power transfer apparatus 8. The transmission 10 is of the type that is preferably applied to an FF vehicle or the like to be installed on a vehicle in a lateral direction thereof (under a transverse state). The transmission 10 includes a first shifting portion 14 mainly comprised of a first planetary gear set 12 of a single pinion type, and a second shifting portion 20 mainly comprised of a second planetary gear set 16 of a double pinion type, and a third planetary gear set 18 of a single pinion type that are formed in a Ravigneaux type. The first and second shifting portions 14 and 20 are coaxially disposed to constitute a shifting mechanism of a step-variable type in which the rotation of an input shaft 22 is shifted in speed to be output from an output rotary member 24.

Figure 4:
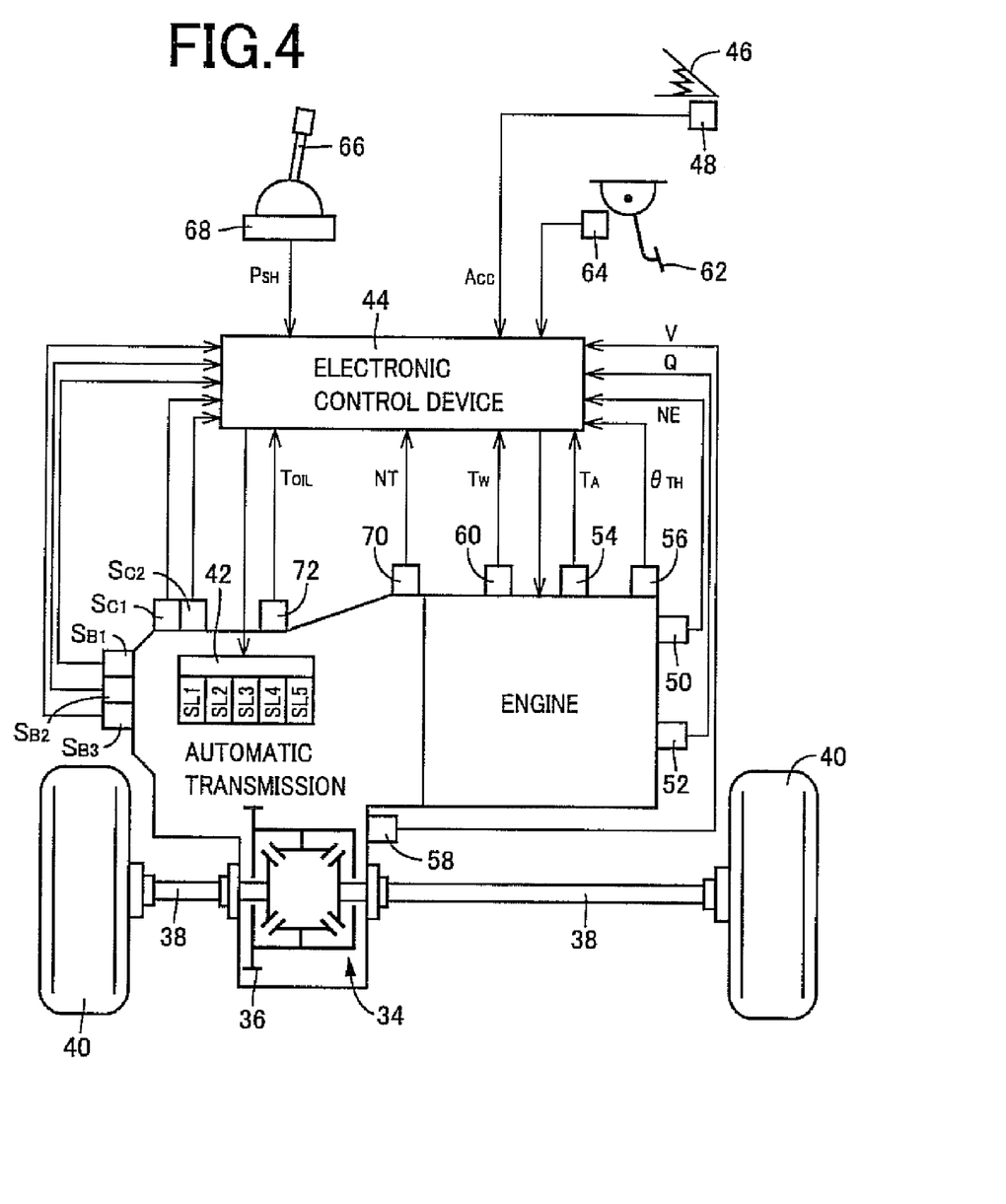
FIG. 4 is a block diagram explaining an electric control system provided in the vehicle to control the power transfer apparatus and the like shown in FIG. 1.

The input shaft 22 corresponds to an input member, and in the present embodiment, includes a turbine shaft of a torque converter 30 that is rotatably driven by an engine 28 acting as a drive-force source to drive the vehicle. Further, the output rotary member 24, corresponding to an output member of the transmission 10, serves as an output gear, i.e., a differential drive gear that is held in meshing engagement with a differential driven gear (large-diameter gear) 36 for transmitting a drive force to a differential gear unit 34 as shown in FIG. 4. The engine 28 provides an output power that is transferred through the torque converter 30, the transmission 10, the differential gear unit 34 and a pair of axles 38 to a pair of drive wheels (front wheels) 40. In addition, the transmission 10 takes the form of a nearly symmetric structure with respect to a center axis, and hence, a lower half of the structure is herein omitted from the skeleton view of FIG. 1.

The engine 28 is an internal combustion engine such as a gasoline-powered engine or the like arranged to combust fuel injected to cylinders for generating the drive force. The torque converter 30 includes a pump wheel 30a connected to a crankshaft of the engine 28, a turbine wheel 30b connected to the input shaft 22 of the transmission 10, and a stator wheel 30c connected to a housing (transmission case) 26 of the transmission 10 via a one-way clutch. This constitutes a hydraulic power coupling device that transfers the drive force generated by the engine 28 to the transmission 10 by means of fluid. A lock-up clutch 32, i.e., a direct-connected clutch, is interposed between the pump wheel 30a and the turbine wheel 30b to be hydraulically controlled in an engaged state, a slipping state or a disengaged state. With the lock-up clutch 32 placed in a completely engaged state, the pump wheel 30a and the turbine wheel 30b are caused to unitarily rotate.

The operation table shown in FIG. 2 represents compiled relationships between various gear positions established in the transmission 10, and operating states of clutches C1 and C2 and brakes B1 to B3, with a symbol "○" representing an engaged state, a symbol "⊙" representing an engaged state achieved only during engine braking, and a blank indicating a disengaged state. The clutches C1 and C2 and the brakes B1 to B3 (hereinafter briefly referred to as a clutch C and a brake B unless especially specified) include hydraulically actuated engaging elements (hydraulically operated friction engaging devices) such as multi-disc type clutches or brakes, respectively, each of which is actuated by a hydraulic actuator These engaging elements are switched in engagements or disengagements upon energizing or de-energizing linear solenoid valves SL1 to SL5 of a hydraulic pressure control circuit 42, described later in detail with reference to FIG. 3, and a transition hydraulic pressure or the like is controlled for engagement or disengagement upon performing current controls of linear solenoid valves SL1 to SL5.

In the transmission 10, six forward-drive gear positions including a 1st-speed gear position "1st" to a 6th-speed gear position "6th" and a reverse-drive gear position "R", are established depending on combined coupling states of various rotary elements (sun gear S1 to S3, carriers CA1 to CA3 and ring gears R1 to R3) of the first and second shifting portions 14 and 20. As shown in FIG. 2, for instance, for the forward-drive gear positions, engaging the clutch C1 and the brake B2 allows the 1st-speed gear position "1st" to be established, and engaging the clutch C1 and the brake B1 allows the 2nd-speed gear position "2nd" to be established. Engaging the clutch C1 and the brake B3 allows the 3rd-speed gear position "3rd" to be established, and engaging the clutches C1 and C2 allows the 4th-speed gear position "4th" to be established. Engaging the clutch C2 and the brake B3 allows the 5th-speed gear position "5th" to be established, and engaging the clutch C2 and the brake B1 allows the 6th-speed gear position "6th" to be established.

That is, for a shifting established among the six forward-drive gear positions including the 1st-speed gear position "1st" to the 6th-speed gear position "6th", a so-called clutch-to-clutch shift is performed for disengaging the first hydraulically operated friction engaging element and engaging the second hydraulically operated friction engaging element. Moreover, engaging both the brakes B2 and B3 allows the reverse-drive gear position "Rev" to be established. Disengaging all of the clutch C and the brake B allows a neutral state to be established. In the transmission 10 of the present embodiment, since a one-way clutch F1 is provided in parallel to the brake B2 for establishing the 1st-speed gear position "1st", no need necessarily arises for the brake B2 to be engaged for startup (acceleration) of the vehicle. In addition, the various gear positions provide speed ratios that are properly determined depending on various gear ratios (=the number of teeth of the sun gear/the number of teeth of the ring gear) ρ1, ρ2 and ρ3 of the first planetary gear unit 12, the second planetary gear unit 16 and the third planetary gear unit 18.

Figure 3:
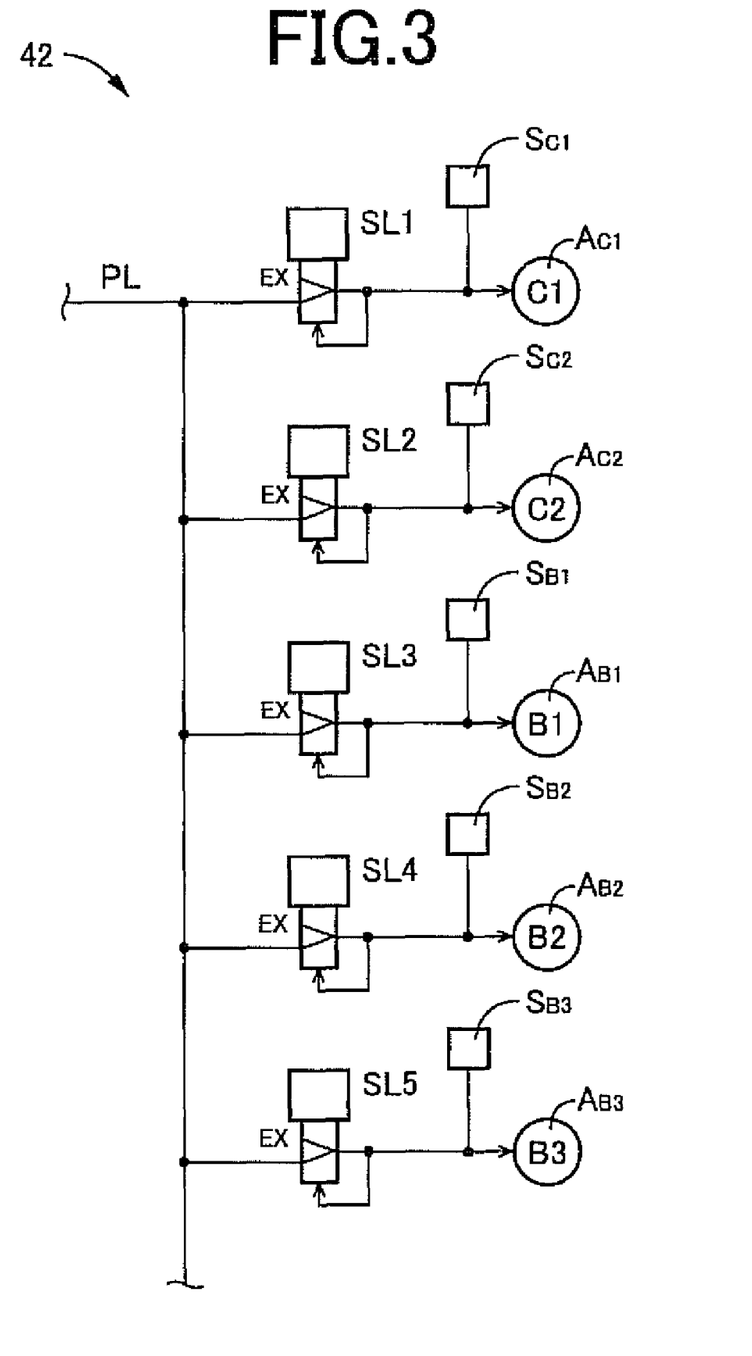
FIG. 3 is a circuit diagram showing a part related to linear solenoid valves, of the hydraulically controlled circuit provided in the power transfer apparatus shown in FIG. 1.

FIG. 3 represents a circuit diagram showing a part of the hydraulic pressure control circuit 42 incorporated in the power transfer apparatus 8 in areas related to the linear solenoid valves SL1 to SL5. As shown in FIG. 3, in the hydraulic pressure control circuit 42, the linear solenoid valves SL1 to SL5 regulate an original pressure in the form of a line hydraulic pressure PL to provide hydraulic pressures regulated depending on command signals applied from the electronic control device 44. These hydraulic pressures are supplied as engaging pressures to various hydraulic actuators (hydraulic cylinders or the like) $A_{C1}$, $A_{C2}$, $A_{B1}$, $A_{B2}$ and $A_{B3}$ of the clutches C1 and C2 and the brakes B1 to B3 incorporated in the transmission 10. A relief-type regulator valve or the like (not shown) is arranged to regulate an output pressure delivered from a mechanical oil pump rotatably driven by the engine 28 or an electromagnetic oil pump, to regulate the line hydraulic pressure PL at a value depending on engine loads, etc., represented in terms of an accelerator-opening or a throttle valve opening.

Further, the linear solenoid valves SL1 to SL5 basically have identical structures. Upon varying a communicating state between an input port and an output port or a drain port in accordance with an electromagnetic force applied to each of solenoids, the output pressures (engaging pressures) of the linear solenoid valves SL1 to SL5 are controlled at regulated pressure levels to be supplied to the hydraulic actuators $A_{C1}$, $A_{C2}$, $A_{B1}$, $A_{B2}$ and $A_{B3}$, respectively. In such a way, the electronic control device 44 independently energizes the solenoids incorporated in the hydraulic actuators $A_{C1}$, $A_{C2}$, $A_{B1}$, $A_{B2}$ and $A_{B3}$, respectively, for independently controlling the hydraulic pressures of the hydraulic actuators $A_{C1}$, $A_{C2}$, $A_{B1}$, $A_{B2}$ and $A_{B3}$, respectively.

Further, in the hydraulic pressure control circuit 42, a hydraulic pressure switch $S_{C1}$ is connected between the linear solenoid valve SL1 and the hydraulic actuator $A_{C1}$ of the clutch C1 for detecting the output pressure of the linear solenoid valve SL1, i.e., the engaging pressure of the clutch C1. Likewise, a hydraulic pressure switch $S_{C2}$ is connected between the linear solenoid valve SL2 and the hydraulic actuator $A_{C2}$ of the clutch C2 for detecting the output pressure of the linear solenoid valve SL2, i.e., the engaging pressure of the clutch C2. Further, a hydraulic pressure switch $S_{B1}$ is connected between the linear solenoid valve SL3 and the hydraulic actuator $A_{B1}$ of the brake B1 for detecting the output pressure of the linear solenoid valve SL3, i.e., the engaging pressure of the brake B1.

Furthermore, a hydraulic pressure switch $S_{B2}$ is connected between the linear solenoid valve SL4 and the hydraulic actuator $A_{B2}$ of the brake B2 for detecting the output pressure of the linear solenoid valve SL4, i.e., the engaging pressure of the brake B2. In addition, a hydraulic pressure switch $S_{B3}$ is connected between the linear solenoid valve SL5 and the hydraulic actuator $A_{B3}$ of the brake B3 for detecting the output pressure of the linear solenoid valve SL5, i.e., the engaging pressure of the brake B3. These hydraulic pressure switches $S_{C1}$, $S_{C2}$, $S_{B1}$, $S_{B2}$ and $S_{B3}$ are arranged to generate output signals, when the engaging pressures of the corresponding hydraulically operated engaging elements, i.e., the clutch C and the brake B, exceed a predetermined value, i.e., for instance, a value in close proximity to the line pressure PL which is preliminarily determined for discriminating if the clutch C and the brake B are completely engaged. As shown in FIG. 2, the clutches C1 and C2 are necessarily caused to engage for any one of the forward-drive gear positions. That is, the engagement of the clutch C1 or the clutch C2 constitutes a requirement for the forward-drive gear positions to be established.

Figure 5:
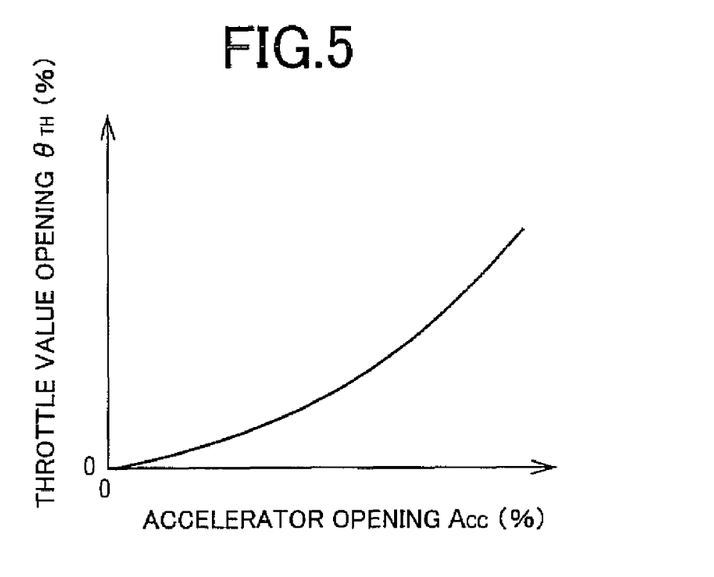
FIG. 5 is a view illustrating a relation between an accelerator opening corresponding to an accelerator pedal operated amount and a throttle opening.
Figure 6:
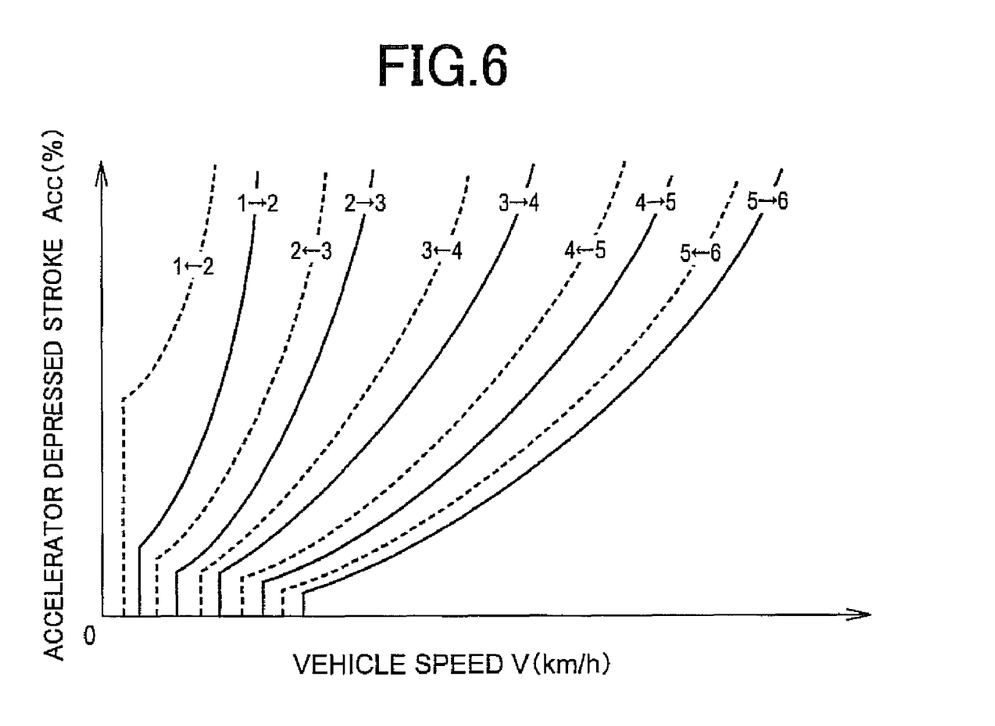
FIG. 6 is a view explaining a shifting diagram used in a shift control of the vehicular automatic transmission performed in an electronic control device shown in FIG. 4.

FIG. 4 is a block diagram illustrating an electrical control system provided on the vehicle for controlling the power transfer apparatus 8 or the like. The electronic control device 44 shown in FIG. 4 includes a so-called microcomputer composed of for example ROM, RAM, CPU and input/output interfaces, etc. The CPU initiates signal processing in accordance with programs preliminarily stored in ROM with utilizing a temporary storage function of RAM to thereby execute various controls related to the power transfer apparatus 8. For instance, basic controls include a throttle-opening control for controlling the throttle opening $\theta_{TH}$ (%) based on an actual accelerator-opening Acc (%) by referring to a preliminarily stored relationship as shown in FIG. 5; a shift control for automatically switching the gear positions in the transmission 10 based on the actual accelerator-opening Acc (%) or the throttle opening $\theta_{TH}$ (%) and a vehicle speed V (km/h), etc., by referring to preliminarily stored relationships as shown in FIG. 6; and feedback controls and learning controls related to such shift control.

Further, the electronic control device 44 is supplied with a signal representing an accelerator depressed stroke Acc that is generated when an accelerator depression-stroke sensor 48 detects a depressed stroke Acc, known as a so-called accelerator-opening, of an accelerator pedal 46. The accelerator pedal 46 is deeply depressed depending on an output demand required by a driver and corresponds to an accelerator-operating member while the accelerator depression stroke Acc corresponds to the output demand. Furthermore, the electronic control device 44 is connected to an engine rotation speed sensor 50 for detecting a rotation speed NE of the engine 28; an intake-air quantity sensor 52 for detecting an intake air quantity Q of the engine 28; an intake-air temperature sensor 54 for detecting a temperature $T_A$ of intake air; an idling-switch-attached throttle sensor 56 for detecting a fully-closed state (idling state) and an opening $\theta_{TH}$ of an electronic throttle valve of the engine 28; a vehicle speed sensor 58 for detecting a vehicle speed V (corresponding to a rotation speed $N_{OUT}$ of the output rotary member 24); a coolant-water temperature sensor 60 for detecting a coolant-water temperature $T_W$ of the engine 28; a brake switch 64 for detecting the presence/absence of a foot brake pedal 62 in the form of a normal use brake being operated; a lever position sensor 68 for detecting a lever position (shifted position) $P_{SH}$ of a shift lever 66 shown in FIG. 7; a turbine rotation speed sensor 70 for detecting a turbine rotation speed NT (=rotation speed $N_{IN}$ of input shaft 42); and an AT-oil temperature sensor 72 for detecting an AT-oil temperature $T_{OIL}$ representing a temperature of working oil in the hydraulic pressure control circuit 42, etc. These sensors and switches supply the electronic control device 44 with various signals representing the engine rotation speed NE; the intake air quantity Q; the intake-air temperature $T_A$; the throttle valve opening $\theta_{TH}$; the vehicle speed V; the engine coolant-water temperature $T_W$; the presence/absence of the brake being operated; the lever position $P_{SH}$ of the shift lever 66; the turbine rotation speed NT; and the AT-oil temperature $T_{OIL}$, etc.

Figure 7:
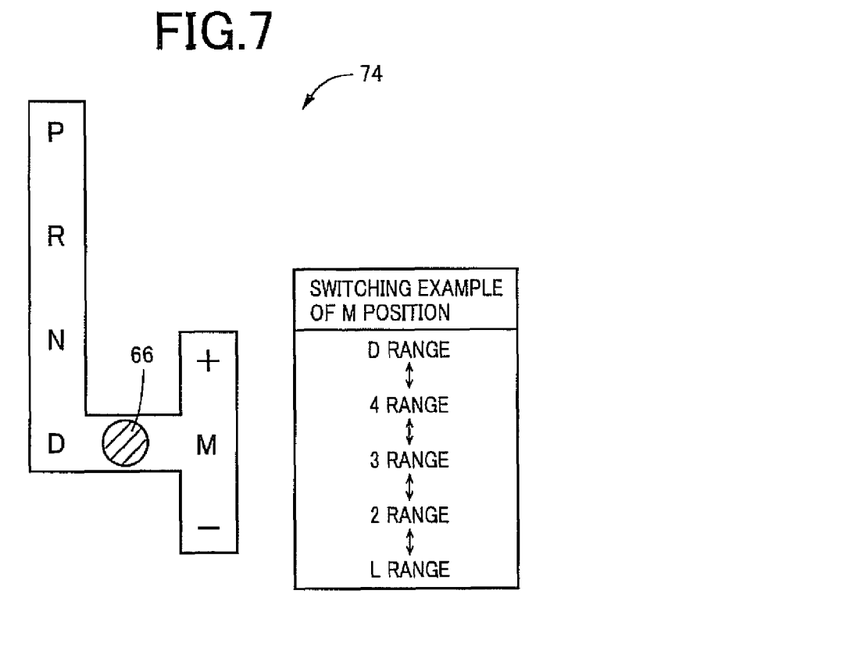
FIG. 7 is a view explaining a shift operation device provided with a shift lever for performing shift change of the vehicular automatic transmission provided in the power transfer apparatus shown in FIG. 1.

FIG. 7 is a view showing one example of a shift operation device 74 as a switching device for switching a plurality kinds of lever positions (shift positions) $P_{SH}$ in the power transfer apparatus 8 by an artificial operation. This shift operation device 74 is disposed at a side of a driver's seat and includes a shift lever 66 operated to select the plurality kinds of lever positions $P_{SH}$. As shown in FIG. 7, the shift lever 66 is constructed for example to be manually operated to five positions including "P", "R", "N", "D" and "M". The position "P" represents a parking command position for the power transfer path of the automatic transmission 10 to be released, that is the power transfer path in the automatic transmission 10 is brought into a neural state, to mechanically block (lock) the rotation of the output gear 24 by a mechanical parking mechanism (not shown). The position "R" represents a reverse-drive command position for the gear position in the automatic transmission 10 to be switched to the reverse-drive gear position "R" for the reverse-drive. The position "N" represents a neutral command position for the automatic transmission 10 to be placed in a neutral state for interrupting the power transfer path thereof. The position "D" represents a forward-drive command position for establishing an automatic shifting mode (D range) for performing the shifting using all of forward-drive gear positions including the 1st-speed gear position "1st" to the 6th-speed "6th" gear position which are entire shift ranges of the automatic transmission 10.

The position "M" represents a forward-drive position for establishing a manually shifting mode in which a manual shift can be performed by switching the shifting ranges corresponding to the manual shift of the shift lever 66 by the driver. In this "M" position, an up-shift position "+" for upshifting the shift range in every operation of the shift lever 66 toward the up-shift side, and a down-shift position "−" for downshifting the shift range in every operation of the shift lever 66 toward the downshift side are provided. The operations of the shift lever 66 to these positions are detected by the lever position sensor 68, or an up-shift switch, a down-shift switch and the like. Because the shift lever 66 is unstable in the up-shift position "+" and the down-shift position "−", it is urged by urging means such as spring and the like to return to the "M" position automatically. Depending on the operation times or the holding time period of the shift lever 66 to the up-shift position "+" and the down-shift position "−", the shifting ranges are changed.

Figure 8:
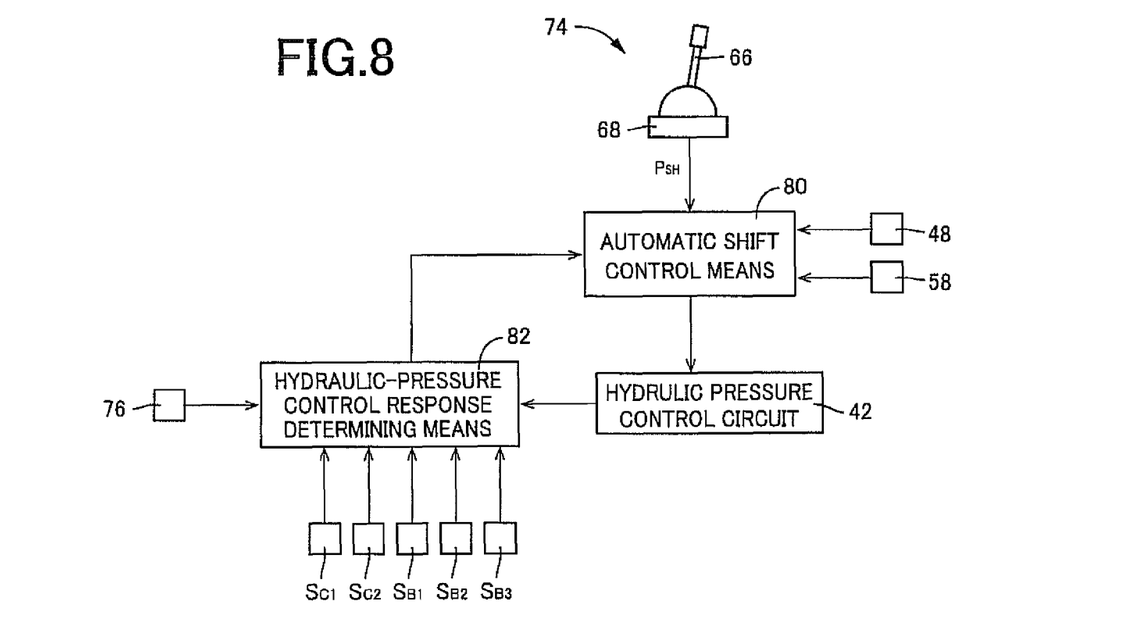
FIG. 8 is a functional block diagram illustrating a major part of a control function to be executed by an electronic control device shown in FIG. 4.

FIG. 8 is a functional block diagram illustrating a major part of a control function to be executed by the electronic control device 44. Automatic shift control means 80 shown in FIG. 8 determines whether to allow the transmission 10 to execute the shifting (i.e., a gear position to be shifted is determined). This determination is based on the predetermined relationship, vehicle speed V and the depressed stroke Acc of the accelerator pedal 46 as shown in FIG. 6, and the actual vehicle speed V detected by the vehicle speed sensor 58, and the actual accelerator depressed stroke Acc detected by the accelerator depression stroke sensor 48. The relationships (such as a shifting diagram and a shifting map) have upshift lines (in solid lines) and downshift lines (in single dot lines) which are preliminarily stored in terms of parameters of for instance. Then, the transmission 10 executes the automatic shifting control via the hydraulic pressure control circuit 42 so as to obtain such a determined gear position.

More particularly, commands (shifting output commands and hydraulic pressure commands) are output to the linear solenoid valves SL1 to SL5 or the like incorporated in the hydraulic pressure control circuit 42, respectively, for engaging and/or disengaging the hydraulically operated engaging elements (clutch C and brake B) related to the shifting in the transmission 10, such that the gear position is established in accordance with, for instance, the engagement table shown in FIG. 2. In other words, the command is output to the hydraulic pressure control circuit 42 for executing a clutch-to-clutch shift by disengaging an on-disengaging engaging device and engaging an on-engaging engaging device both being related to the shifting of the transmission 10. Upon receipt of such command output in such way, the hydraulic pressure control circuit 42 allows the linear solenoid valves SL1 to SL5 to regulate the hydraulic pressures supplied to the hydraulic actuators associated with the hydraulically operated friction engaging devices, i.e., the brake B and the clutch C, respectively.

Further, the above automatic shift control means 80 determines whether to allow the transmission 10 to execute the shifting depending on operation of the shift lever 66 of the shift operation device 74 (that is, a gear position to be shifted is determined). Then, the hydraulic pressure control circuit 42 allows to perform the automatic shifting control of the transmission 10 so as to obtain the determined gear position. In particular, during a manual shifting mode with the shift lever 66 placed in an "M" position, if the shift lever 66 is operated to an upshift position "+", the gear position is shifted to an upshift side in the transmission 10, and if the shift lever 66 is operated to a downshift position "−", the gear position is shifted to an downshift side in the transmission 10. Thus, the manual shifting control is performed.

Furthermore, the automatic shift control means 80 basically executes a control, as described below, during the execution of the manual shifting (during the shifting in the manual shifting mode) initiated depending on operation of the shift lever 66 of the shift operation device 74. That is, a high-response shifting control is performed in the manual shifting mode to quicken the shifting response, i.e., shifting responding characteristic than that of the shifting other than the manual shifting, i.e., in an automatic shifting (during the shifting in an automatic shifting mode) initiated depending on the vehicle speed V and the accelerator depressed stroke Acc by referring to the preliminarily stored relationships shown in FIG. 6. Stated another way, during the automatic shifting initiated depending on the vehicle speed V and the accelerator depressed stroke Acc by referring to the preliminarily stored relationships shown in FIG. 6, the transmission 10 performs the shift control with a further mild shifting response than that of the shift control performed during the manual shifting initiated depending on operation of the shift lever 66 of the shift operation device 74.

Figure 9:
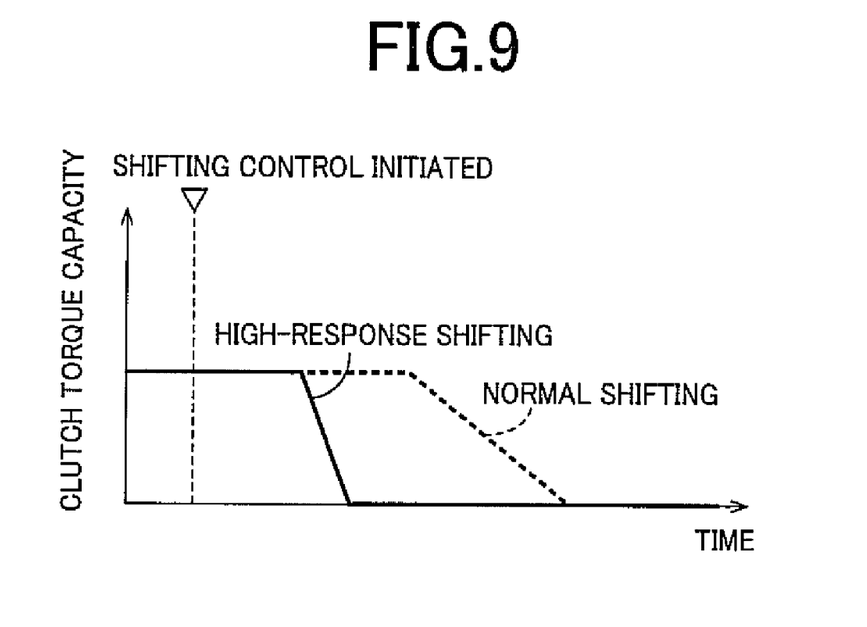
FIG. 9 is a view for illustrating a shift control executed during a manual shifting and other shift control executed during an automatic shifting in comparison, and represents a timing chart of a clutch torque capacity in an hydraulically operated engaging element at a drain-side.
Figure 10:
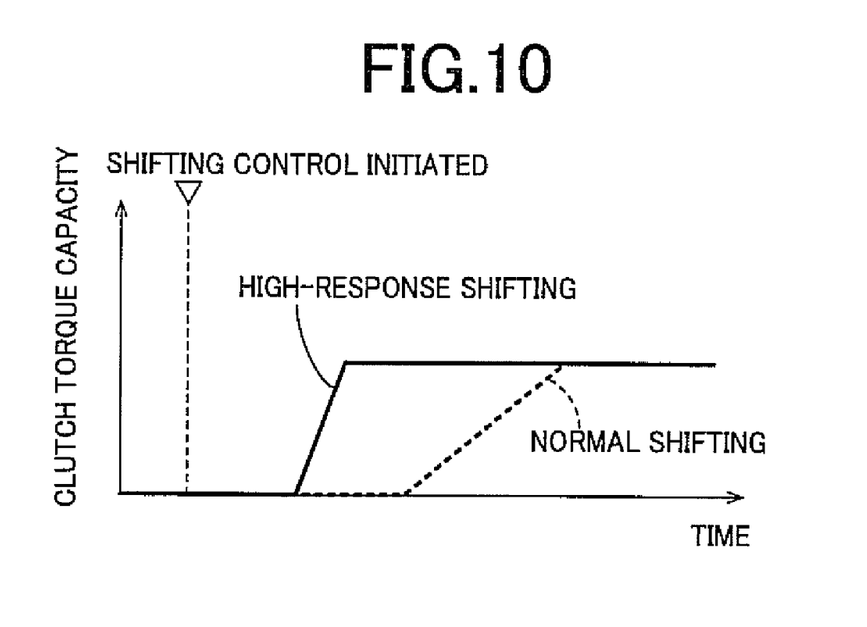
FIG. 10 is a view for illustrating a shift control executed during a manual shifting and other shift control executed during an automatic shifting in comparison and represents a timing chart of a clutch torque capacity in the hydraulically operated engaging element at an apply-side.

FIGS. 9 and 10 are views illustrating the high-response shifting control, i.e., the shift control performed during such a manual shifting (in the manual shifting mode), and a normal shift control, i.e., the other shift control performed during the automatic shifting (in the automatic shifting mode), in comparison. FIG. 9 shows a timing chart of a clutch torque capacity in the drain-side (disengaging-side) hydraulically operated engaging device, and FIG. 10 shows a timing chart of a clutch capacity of an apply-side (engaging-side) hydraulically operated engaging device. As shown in FIGS. 9 and 10, during the high-response shifting control under the manual shifting depending on the operation of the shift lever 66 of the shift operation device 74, the automatic shift control means 80 controls the linear solenoid valves SL1 to SL5 described below. That is, the control is executed such that the beginning of engagement or the beginning of disengagement of the hydraulically operated engaging element, i.e., complete engagement or complete disengagement of the hydraulically operated engaging element at the beginning of the shift control (shifting output) are initiated to be faster than those achieved in the normal shift control for the automatic shifting executed depending on the vehicle speed V and the accelerator depressed stroke Acc by referring to the preliminarily stored relationships shown in FIG. 6.

Figure 11:
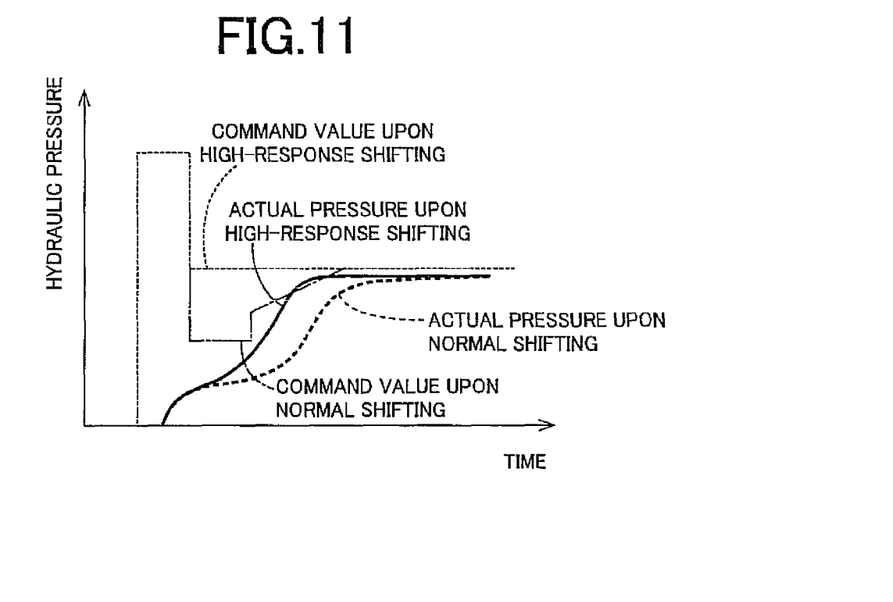
FIG. 11 is a view for exemplifying a control command value for realizing the shift control during the manual shifting and the shift control during the automatic shifting in association with an operation in the hydraulically operated engaging element at apply-side.

This control is accomplished by controlling values of the commands applied to the linear solenoid valves SL1 to SL5 as shown, for instance, in FIG. 11. As shown in FIG. 11 corresponding to a control executed for an apply-side hydraulically operated engaging element, by controlling a command value applied to a linear solenoid valve associated with a hydraulically operated engaging element engaged (or disengaged) in a targeted or objected shifting, the high-response shifting control for the manual shifting mode and the normal shifting control for the automatic shifting mode can be realized. Moreover, employing another method for controlling the shifting response may be conceived. In the another method, a backpressure of an accumulator associated with an engaging element related to the shifting, is controlled so as to obtain a faster shifting response than that of the shift control for the automatic shifting mode.

Turning back to FIG. 8, hydraulic-pressure control response determining means 82 determines whether a response of the hydraulic pressure control executed by the hydraulic pressure control circuit 42 satisfies a preset predetermined determining criterion. For instance, whether air mixture to the working oil contained in the hydraulic pressure control circuit 42 is queried. If the answer to this query is yes, i.e., when mixture to the working oil is determined, then, no satisfaction of the determining criterion is determined. In other words, the hydraulic-pressure control response determining means 82 queries as to whether the response of the hydraulic pressure control executed by the hydraulic pressure control circuit 42 is adequate to execute the high-response shifting control. If the answer to this query is no, i.e., when such a response of the hydraulic pressure control is not adequate to execute the high-response shifting control, then, a failure of response to satisfy the determining criterion is determined.

The hydraulic-pressure control response determining means 82 preferably determines, based on actual performance in which a hydraulic pressure with a predetermined volume or more is applied for a predetermined time period from turn-on of an ignition switch 76, if air is mixed to the working oil in the hydraulic pressure control circuit 42. That is, a query is made whether the hydraulic pressure supplied to the actuator $A_{C1}$ associated with a predetermined hydraulically operated engaging element (for instance, the first clutch C1 engageable in the 1st-speed gear position "1st") reaches a predetermined value (whether the engagement completion is detected by the hydraulic pressure switch $S_{C1}$) after an elapse of a preset predetermined time period from turn-on of the ignition switch 76. If the answer to this query is no, then, occurrence of air-mixture to the working oil associated with the actuator $A_{C1}$ is determined.

Further, the hydraulic-pressure control response determining means 82 preferably determines after turn-on of the ignition switch 76, if air is mixed to the working oil in the hydraulic pressure control circuit 42 in the shifting at a first time or the shifting at a second time and later That is, the hydraulic-pressure control response determining means 82 queries as to whether the hydraulic pressure supplied to the actuator corresponding to the apply-side engaging element related to shifting reaches a predetermined value, after an elapse of a predetermined time period after the shifting of the transmission 10 is output. If the answer to this query is no, then, occurrence of air mixture to the working oil associated with the relevant actuator is determined. In such a mode, preferably, a query is made for each shifting (a shifting from respective gear position to other gear position in the operation table shown in FIG. 2) as to whether air is mixed to the working oil in the hydraulic pressure control circuit 42. Moreover, the hydraulic-pressure control response determining means 82 preferably determines occurrence of air mixture to the working oil in the hydraulic pressure control circuit 42, after the elapse of the predetermined time period after turn-on of the ignition switch 76.

If the hydraulic-pressure control response determining means 82 determines that the response of the hydraulic pressure control executed by the hydraulic pressure control circuit 42 fails to satisfy, i.e., does not satisfy the preset predetermined determining criterion, the automatic shift control means 80 suppresses the shifting response from quickening, i.e., quickening of the shifting response, in comparison to a case where the determining criterion is satisfied. In other words, the shift control is performed with a gradual response in comparison to the case where the determining criterion is satisfied. For instance, even under the shifting in the manual shifting mode, i.e., during the manual shifting performed by the shift lever 66 of the shift operation device 74, the automatic shift control means 80 disables execution of the high-response shifting control and performs the control to achieve the same shifting response as that upon the automatic shifting (in the normal shift). Upon the automatic shift, the shift control is performed depending on the vehicle speed V and the accelerator depressed stroke Acc by referring to the preliminarily stored relationships.

During the shifting related to at least one gear position of the transmission 10, if the hydraulic-pressure control response determining means 82 determines that the response of the hydraulic pressure control executed by the hydraulic pressure control circuit 42, fails to satisfy the predetermined determining criterion, then, the automatic shift control means 80 preferably executes the following control. That is, the automatic shift control means 80 suppresses the extent of quickening of the shifting response (suppresses quickening of the shifting response), in comparison to a case where the determining criterion is satisfied during the shifting related to in an entire gear positions. Here, "shifting response is quick" or "quick shifting response" respectively mean that a shifting action is operated quickly or quick shifting action, or shifting speed is quick or quick shifting speed. This control intends to prevent a driver from having uncomfortable feeling which is caused by the high-response shifting being permitted for one shifting related to a predetermined gear position is inhibited in other gear position. During such mode, the automatic shift control means 80 executes the high-response shifting for instance only when the air-mixture determination related to the entire engaging elements is made negative (no air being mixed).

Only during the shifting related to the gear position in which the hydraulic-pressure control response determining means 82 determines that the response of the hydraulic pressure control executed by the hydraulic pressure control circuit 42 fails to satisfy the predetermined determining criterion, the automatic shift control means 80 preferably suppresses quickening of the shifting response, in comparison to a case where the determining criterion is satisfied. For instance, only during the shifting related to the gear position with the determination that for instance a response of the apply-side hydraulically operated engaging element related to a targeted shifting fails to satisfy the predetermined determining criterion, the automatic shift control means 80 preferably suppresses quickening of the shifting response, in comparison to the case where the determining criterion is satisfied. This control intends to inhibit the high-response shifting only during the shifting (the shifting with possibility of causing a turbine blow-up due to response delay of the hydraulic pressure) related to a particular gear position in which no high-response shifting should be executed, but to execute the high-response shifting for the shifting related to a gear positions) except for such particular gear position for thereby improving responses in those shifting.

Figure 12:
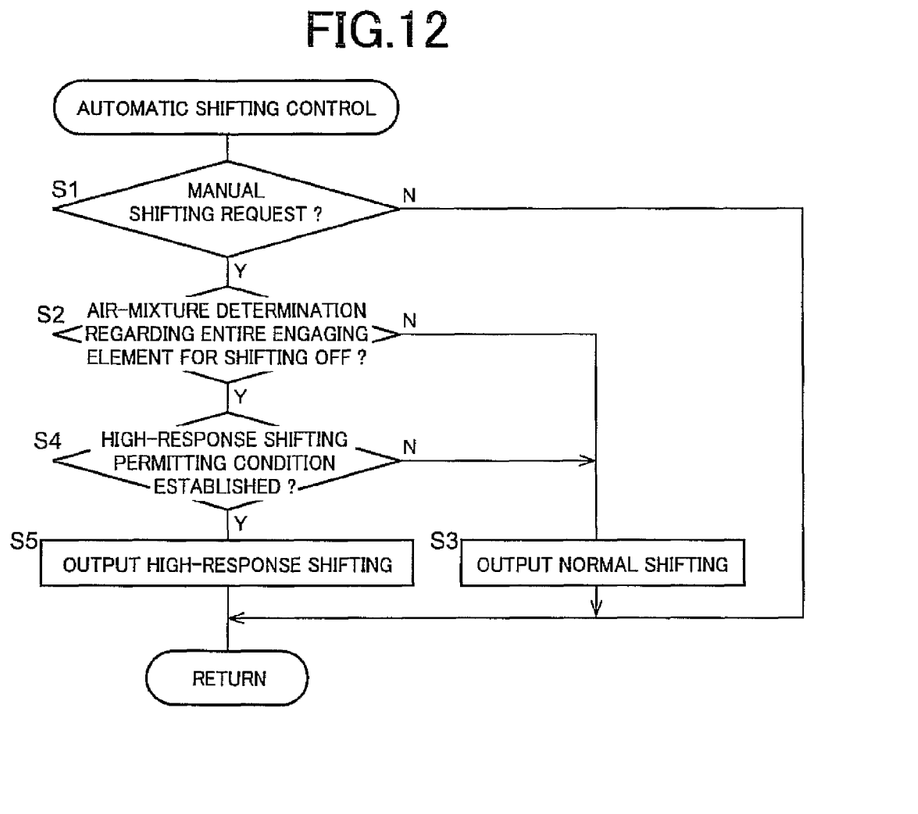
FIG. 12 is a flow chart illustrating a major part of an automatic shifting control to be executed by the electronic control device shown in FIG. 4.

FIG. 12 is a flow chart illustrating a major part of the automatic shifting control to be executed by the electronic control device 44 with a sequence being repeatedly executed for a given cycle.

First, at step (hereinafter the term "step" will be omitted) S1, whether a manual shifting request corresponding to operations by the shift lever 66 of the shift operation device 74, is queried. If the answer to S1 is no, then, the current routine is terminated. If the answer to S1 is yes, then, at S2 corresponding to the hydraulic-pressure control response determining means 82, a query is made as to whether the air-mixture determinations regarding the hydraulically operated engaging elements related to the entire gear positions in the transmission 10, are negative (no air mixture determined).

If the answer to S2 is no, at S3, a shift control is output so as to achieve the same shifting response as that of the normal shifting, i.e., the shift control executed depending on the vehicle speed V and the accelerator depressed stroke Acc by referring to the preliminarily stored relationships, followed by completion of the current routine. If the answer to S2 is yes, at S4, a query is made as to whether establishment of a high-response shifting permitting condition which includes for instance, the AT oil temperature being higher than a predetermined temperature, or no failure being present in the transmission 10. If the answer to S4 is no, then, processes subsequent to S3 are executed. If the answer to S4 is yes, at S5, the high-response shifting control is output with higher response than that of the normal shifting, in which the shift control is executed depending on the vehicle speed V and the accelerator depressed stroke Acc, by referring to the preliminarily stored relationships, followed by completion of the current routine. In the foregoing control, S3 and S5 correspond to the operation of the automatic shift control means 80.

Figure 13:
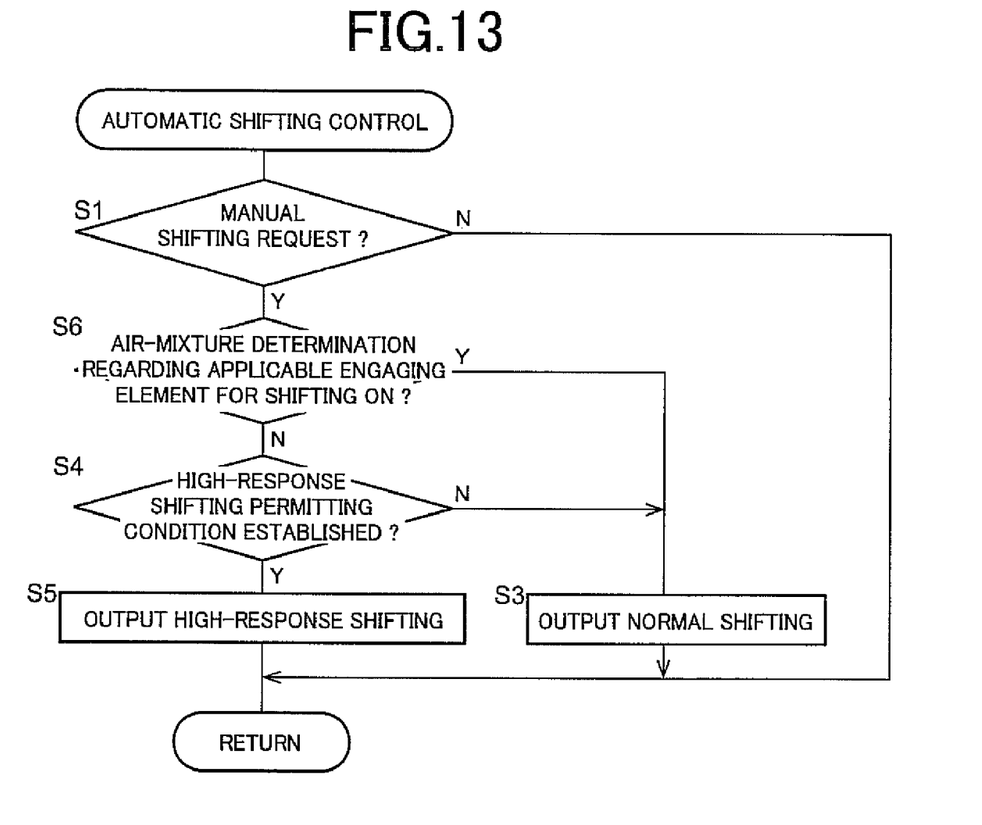
FIG. 13 is a flow chart illustrating a major part of another example of the automatic shifting control to be executed by the electronic control device shown in FIG. 4.

FIG. 13 is a flow chart illustrating a major part of another example of the automatic shifting control to be executed by the electronic control device 44 with a sequence of operation being repeatedly executed for a predetermined cycle. In the control shown in FIG. 13, steps common to those of the control shown in FIG. 12 bear the same references to omit repeating description of the same.

In the control shown in FIG. 13, if the answer to S1 is yes, i.e., the manual shifting request corresponding to operation of the shift lever 66 of the shift operation device 74 is determined, then at S6 corresponding to the operation of the hydraulic-pressure control response determining means 82, a query is made as to whether the air-mixture determination related to the applicable shifting is positive (air mixture determined). If the answer to S6 is yes, then, the above processes subsequent to S3 are executed, while the answer to S6 is no, then, the above processes subsequent to S4 are executed.

In the present embodiment, the control device for the vehicular automatic transmission 10, which has the plurality of hydraulically operated engaging elements, i.e., the clutch C and the brake B, and the hydraulic pressure control circuit 42 for controlling the hydraulic pressures supplied to the plurality of hydraulically operated engaging elements, and the shifting response of which is varied depending on a predetermined condition by referring to the predetermined relationships, executes the control in a manner described below. That is, when the response of the hydraulic pressure control executed by the hydraulic pressure control circuit 42 fails to satisfy the predetermined determining criterion, the control device suppresses quickening of the shifting response as compared to the case where the determining criterion is satisfied. Accordingly, under a state where the response of the hydraulic pressure control executed by the hydraulic pressure control circuit 42 is relatively low due to the air mixture to the working oil or the like, the control to inhibit the high-response shifting is performed to preferably prevent the occurrence of a turbine blow-up caused by the response delay in hydraulic pressure. Thus, the control device for the transmission 10 can be provided, which can realize the shifting in the quickened response with suppressing the turbine blow-up during the shifting.

Further, if air is mixed to working oil in the hydraulic pressure control circuit 42, then, no satisfaction of the determining criterion is determined. Therefore, the status of the relatively low response of the hydraulic pressure control executed by the hydraulic pressure control circuit 42 is determined in a practical mode.

Furthermore, only during the shifting related to achieved to the gear position in which the response of the hydraulic control executed by the hydraulic pressure control circuit 42 fails to satisfy the preset predetermined determining criterion, the control device suppresses quickening of the shifting response, in comparison to the case where the determining criterion is satisfied. Therefore, the shifting of relatively low response of the hydraulic pressure control can be realized with suppressing the turbine blow-up, and the quickened response can be realized for the other shifting(s).

Moreover, if the response of the hydraulic pressure control executed by the hydraulic pressure control circuit 42 fails to satisfy the preset predetermined determining criterion during the shifting related to the at least one gear position, quickening of the shifting response is suppressed, as compared to the case where the determining criteria are satisfied during the shifting related to the entire gear positions. Thus, the driver is prevented from having uncomfortable feeling caused by the high-response shifting being permitted for the predetermined shifting is inhibited for the other shifting.

Besides, the shift operation device 74 is provided to execute the manual shifting of the transmission 10 by the operation initiated by the driver. Upon the shifting initiated depending on the shift operation device 74, the high-response shifting control is performed to quicken the shifting response than that of the shift control executed for the other shifting. If the response of the hydraulic pressure control executed by the hydraulic pressure control circuit 42 fails to satisfy the predetermined determining criterion, then, execution of the high-response shifting control is disabled. Regarding the control device of the transmission 10 arranged to perform the control for quickening the shifting response, upon the manual shifting by the shift operation device 74, occurrence of the turbine blow-up caused by the delayed response can be preferably prevented.

While the present invention is described above with reference to the preferred embodiments shown in the drawings, the present invention is construed not to be limited to such embodiments but may be implemented in various other modes.

For instance, in the illustrated embodiment, the hydraulic-pressure control response determining means 82 is arranged to determine that, upon occurrence of air mixture to working oil in the hydraulic pressure control circuit 42, the response of the hydraulic pressure control executed by the hydraulic pressure control circuit 42 fails to satisfy the preset predetermined determining criterion. However, the present invention is not limited to such arrangement. For instance, an alternative arrangement may be of the type in which whether the response of the hydraulic pressure control executed by the hydraulic pressure control circuit 42 fails to satisfy the predetermined determining criterion is determined not only for a case air being mixed to working oil but also for a case working oil lying at temperatures below a predetermined value.

Further, in the illustrated embodiment, the automatic shift control means 80 is arranged to disable the execution of the high-response shifting control for the manual shifting, when the response of the hydraulic pressure control executed by the hydraulic pressure control circuit 42 fails to satisfy the preset predetermined determining criterion. However, the present invention is construed not to be limited to such arrangement. The automatic shift control means 80 may be arranged so as to perform a control in a medium-response control, when the response of the hydraulic pressure control executed by the hydraulic pressure control circuit 42 fails to satisfy the preset predetermined determining criterion under a circumstance where for instance the hydraulic pressure control circuit 42 performs medium response controls determined in three stages. These include a low-response shift control for a usual shifting mode, a high-response shifting mode for a manual shifting mode, and a medium-response shift control higher in response than that of the low-response shift control and lower in response than that of the high-response shifting control.

Furthermore, the embodiment was described for a technology of suppressing the execution of the high-response shifting control, when the response of the hydraulic pressure control executed by the hydraulic pressure control circuit 42 fails to satisfy the preset predetermined determining criterion, upon the high-response shifting control in the shifting depending on the shift operation device 74. However, the present invention is not limited to such a technology. An alternative may be arranged to perform a similar control during a mode of performing the high-response shifting control depending on, for instance, other conditions. Thus, the present invention is construed not to be limited to the high-response shifting control initiated during the shifting depending on the shift operation device 74.

Moreover, the embodiment was described with reference to the mode under which the high-response shifting control is executed during the shifting depending on the operation of the shift operation device 74 equipped with the shift lever 66. However, the present invention may be preferably applied to a vehicle for example having a so-called paddle shift operation device which realizes the manual shifting operating for instance a paddle located on a steering wheel.

The present invention may be implemented with adding various modifications without departing from the scope of the present invention, which are however not illustrated individually.

What is claimed is:

1. A control device for a vehicular automatic transmission, comprising:
    a plurality of hydraulically operated engaging elements, and a hydraulic pressure control circuit for controlling hydraulic pressures supplied to the plurality of hydraulically operated engaging elements, and a shifting response of which is quickened depending on a predetermined condition based on a preset relationship;
    an extent of quickening of the shifting response being suppressed when a response of the hydraulic pressure control executed by the hydraulic pressure control circuit fails to satisfy a preset predetermined determining criterion, compared with when the response satisfies the determining criterion;
    wherein when air is mixed to working oil in the hydraulic pressure control circuit, failure to satisfy the determining criterion is determined.

2. The control device for the vehicular automatic transmission according to claim 1, wherein the extent of quickening of the shifting response is suppressed only during the shifting related to a gear position where the response of the hydraulic pressure control executed by the hydraulic pressure control circuit fails to satisfy the preset predetermined determining criterion, compared with during the shifting related to a gear position where the response satisfies the determining criterion.

3. The control device for the vehicular automatic transmission according to claim 1, wherein the extent of quickening of the shifting response is suppressed during the shifting related to at least one gear position where the response of the hydraulic pressure control executed by the hydraulic pressure control circuit fails to satisfy the preset predetermined determining criterion, compared with during the shifting related to entire gear positions where the response satisfies the determining criterion.

4. The control device for the vehicular automatic transmission according to claim 1, further comprising a shift operation device operative to perform a manual shifting of the automatic transmission depending on a driver's operation, wherein during a shifting initiated depending on an operation of the shift operation device, a high-response shifting control is performed to quicken the shifting response than other shifting, and execution of the high-response shifting control is disabled when the response of the hydraulic pressure control executed by the hydraulic pressure control circuit fails to satisfy the preset predetermined determining criterion.

* * * * *